INVENTOR.
HAROLD J. McCREARY
BY
[signature]
ATTORNEY

April 27, 1954 H. J. McCREARY 2,677,079

CONCENTRIC TRANSLATING DEVICE

Filed June 11, 1949 3 Sheets-Sheet 2

*INVENTOR.*
HAROLD J. McCREARY

*BY* Chas. W. Cardy

ATTORNEY

INVENTOR.
HAROLD J. McCREARY

BY

ATTORNEY

Patented Apr. 27, 1954 2,677,079

UNITED STATES PATENT OFFICE 2,677,079

CONCENTRIC TRANSLATING DEVICE

Harold J. McCreary, Lombard, Ill., assignor to Automatic Electric Laboratories, Inc., Chicago, Ill., a corporation of Delaware Application June 11, 1949, Serial No. 98,606

9 Claims. (Cl. 317—235)

This invention relates to electrical translating devices and more particularly to those of the solid contact type employing a unidirectional semi-conductive element.

The objects of the invention are to provide a non-thermionic, non-vacuum rectifier and amplifier, and to achieve these ends in a simple and efficient mechanism.

Solid contact detectors have been known and used as rectifying devices for many years, dating back probably as early as 1906. However, their shortcomings were many, including such limitations as the contact with the crystal being broken when the "cat whisker" was jarred a bit, and even more limiting, the fact that satisfactory amplification of the incoming signal could not be obtained. General usage of this basic detector was more or less abandoned with the introduction and development of the vacuum tube.

The vacuum tube, however, is at best an expensive item to produce, is generally bulky, easily subject to breakage and in ordinary usage requires a heavy supply of current to heat its cathode.

Applicant has overcome these objections by employing unidirectional qualities of certain substances and conceiving the idea that amplification could be had if it were possible to fixedly arrange two conductors minutely spaced apart in contact with a semi-conductor having unidirectional characteristics. Applicant has reduced this principle to practice achieving a translating device which will perform essentially all the functions of a standard vacuum tube without the incident production costs of a vacuum tube, without appreciable bulk and which requires no filament heating current supply.

A feature of the invention, therefore, is to provide a translating device which is simple in construction and adapted to relatively low cost production methods which will ultimately be reflected in a substantially diminished cost to the consumer.

Another feature of the invention constitutes the close spacing and fixed position of the contact element on a semi-conductor by reason of which amplification is achieved.

A further feature of the invention lies in the desirability of a translating device which requires no filament heating current.

Still another feature of the invention lies in its adaptability to small size and compact form allowing its use in places heretofore limited because of space and still further opens a field for smaller overall electronic devices because of the diminished size of component translating elements.

Other features will become apparent upon further perusal of the specification and together with the features pointed out will be explained fully hereinafter, reference being had to the accompanying drawings comprising Figs. 1 to 10, inclusive, in which.

Figure 1:
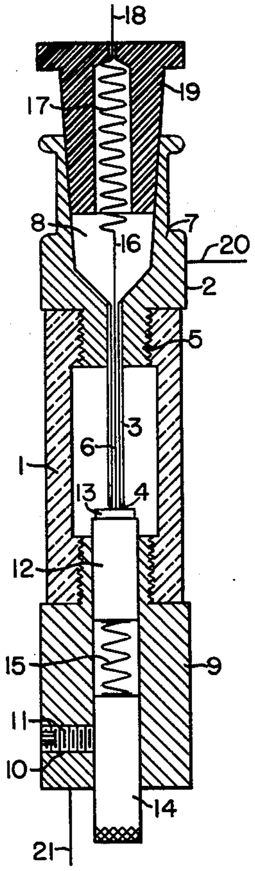
Fig. 1 is an axial cross sectional view of the concentric triode translating device.
Figure 2:
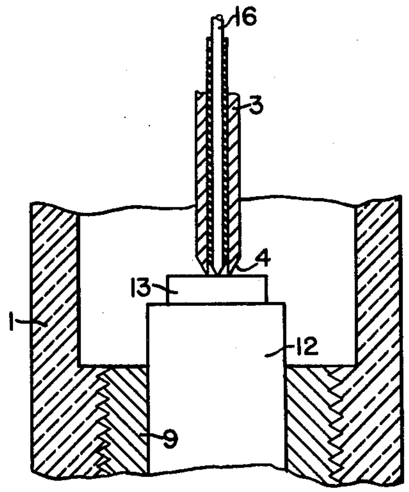
Fig. 2 is an enlarged cut away axial cross sectional view of the triode depicting the contact relation of the elements thereof with the semi-conductive crystal.

Referring now to Fig. 1 of the drawings for a detailed description of the triode translator structure and its operation, an envelope defining a cavity therein for housing a semi-conductive crystal element is formed by a hollow cylinder of insulating material 1 which is threaded on its interior at both ends. Into one end of this envelope 1 is threaded a metal sleeve 2 comprising essentially three steps of increasing diameter, the smallest diameter step or collector 3 extending into envelope 1 where it terminates in a sharply tapered circular knife edge tip 4, the middle step 5 threaded on its exterior to fit into the end of envelope 1 described hereinbefore, and both steps 3 and 5 having a uniform small bore 6 which widens out in the largest step or shank end 7 into a mouth 8 the interior of which may or may not be threaded depending upon the type of plug to be fitted therein which will be described and whose purpose will be set forth later. A particular embodiment of this sleeve 2 can be a standard #28 hypodermic needle with cannula 3, the part of the shank adjacent the cannula turned down and threaded 5, and a shank 7 with mouth 8, the cannula sharply tapered to a knife edge tip 4, lumen 6 extending thru cannula 3 and threaded middle step 5, widening into mouth 8 in shank end 7. Into the other end of envelope 1 is a threaded metal sleeve 9 containing a lateral tapped bore 10 for receiving a small set screw 11, the purpose for which will also be set out hereinafter. Into sleeve 9 is slidably inserted a short brass rod 12 forming a base electrode, one end of which extends into envelope 1 and mechanically and electrically fixed to said end of the short brass rod is a semi-conductive element or crystal 13, one embodiment of which may be a standard Sylvania 1N34 type of Germanium crystal. Rearward of said short brass rod 12 with relation to the envelope 1 in sleeve 9 is slidably inserted a brass control rod 14 one end of which protrudes so that it may be grasped between index finger and thumb and moved in or out as desired. Also within sleeve 9 and between short rod 12 and control rod 14 is a compression spring 15. Movement inward of control rod 14 will exert a force on spring 15 which will in turn force short rod 12 forward pressing the semi-conductive element 13 against knife edge tip 4 collector sleeve 3 making solid circula electrical contact therewith. The tip of the knife edge 4 of the cannula 3 may be copper plated and lightly wetted with mercury further to insure good electrical contact with the crystal 13. Set screw 11 is then threaded into lateral bore 10 providing locking means for control rod 14, the circular electrical contact of collector tip 4 with semi-conductive element 13 being fixed and permanent. A fine thinly insulated nickel chrome emitter wire 16 with a ground point tip is fed down the small bore 6 of sleeve 3, wire diameter plus insulation being exactly the size of the bore, until said pointed tip contacts crystal 13. The portion of the emitter wire within the mouth 8 is now coiled into a spring 17 with the free end 18 passing out of said mouth used as a lead wire for connections.

Figure 3:
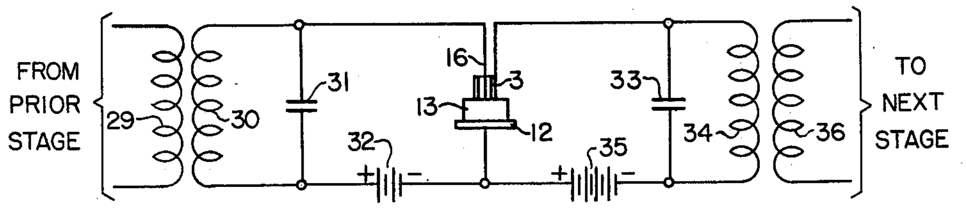
Fig. 3 is an intermediate frequency, I. F., amplifying stage of a standard superheterodyne circuit with the concentric triode in circuit symbol substituted for the amplifier tube.

A plug 19 of an insulating material such as polystyrene or Polythene is provided and shaped to fit mouth 8 by force fit or threaded as desired, plug 19 being center bored a portion of its axial length of a diameter to encase the spring portion 17 of emitter wire 16, the remaining length center bored of a diameter to permit passage out of free end 18. When the plug 19, encasing the spring 17, is pressed into mouth 8, the pointed tip of emitter wire 16 is pressed firmly into point contact with crystal 13 and firmly and permanently so held. Said point contact of emitter wire on crystal 13 will then be permanently held in very close proximity with the circular knife edge contact of tip 4 on crystal 13 concentrically surrounding said emitter point, the distance of separation being at all points the radius of emitter wire 16 plus the thickness of the insulation thereon. At 18, 20 and 21, leads to the component elements of the triode translating device are indicated. In Fig. 3 is shown a circuit depiction of a standard I. F. amplifying stage in a superheterodyne circuit with a triode transistor substituted for the conventional triode vacuum tube. The I. F. voltage from the previous stage is induced from the primary winding 29 of a transformer to the secondary winding 30 thereof. This I. F. frequency is then fed thru the triode translating device hereinbefore described over an input circuit from control electrode or emitter wire 16 thru the tuned input tank circuit comprising condenser 31 and secondary winding 30, battery 32, base electrode 12, and thru crystal 13. Amplification occurs in the output circuit traced from collector 3 thru output tuned tank circuit comprising condenser 33 and primary winding 34 of transformer, and battery 35, base electrode 12 and crystal 13. The amplification gain realized thereby is impressed upon the secondary winding 36 of the transformer to feed into the next stage. The triode translating device may be similarly substituted for a triode vacuum tube in the last or audio-amplifying stage.

Figure 4:
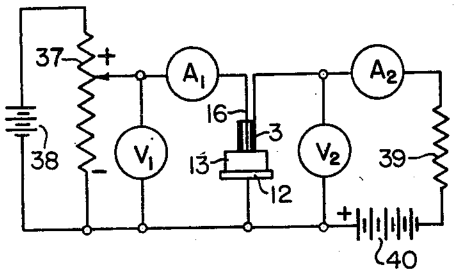
Fig. 4 is a test circuit for the concentric triode translating device with a potentiometer to vary the resistance in the input circuit and a voltmeter and ammeter in both input and ouput circuit on which to read test data. The meters are labeled $A_1$, $V_1$ and $A_2$ $V_2$, respectively.

In Fig. 4 of the drawings is shown a test circuit having an input and output circuit feeding into and out of the various elements of the concentric triode translating device. The input circuit is traced from the control or emitter wire 16 thru an input ammeter $A_1$, a variable resistance potentiometer 37, battery 38, base electrode 12 and thru crystal 13. Input voltmeter $V_1$ is bridged across emitter wire 16 and base electrode 12. Potential for the input circuit is furnished by battery 38. The output circuit is traced from collector element 3 thru output ammeter $A_2$, fixed resistance 39, battery 40, base electrode 12 and thru crystal 13. Again, an output voltmeter, $V_2$, is bridged across collector element 3 and base electrode 12. With the input voltage constant, input current is varied by changing resistance by moving the arm of potentiometer 37. That a gain is achieved in the output circuit is evidenced from perusal of data obtained by reading output meters $A_2$ and $V_2$ and plotting input readings against output readings on graphs in Figs. 5 to 7, inclusive.

Figure 5:
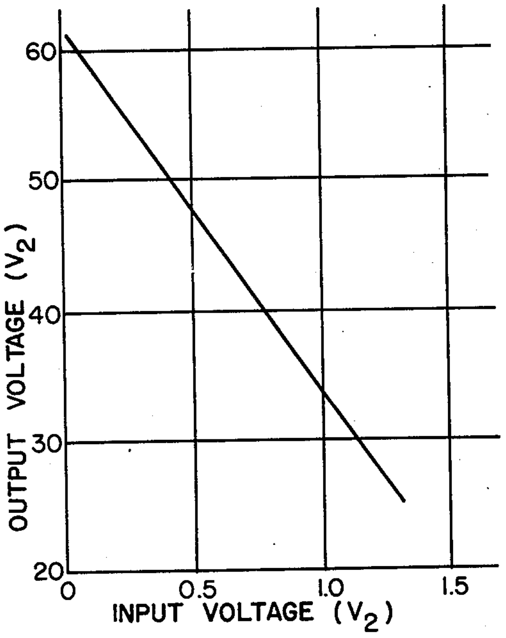
Figs. 5, 6 and 7 are graphs of test data obtained by varying the resistance in the circuit in Fig. 4 by means of the potentiometer 37.

In Fig. 5 input voltage $V_1$ in volts is plotted as the abscissa while output voltage $V_2$ is plotted as the ordinate. As the input voltage was decreased from the vicinity of 1.5 volts to approximately .1 volt, the output voltage across base electrode 12 and collector 3 as measured by the voltmeter $V_2$ increased from 20 to 60 volts. Since battery 40 is always of lesser potential than battery 38, this represents an appreciable output voltage increase or gain therein.

Figure 6:
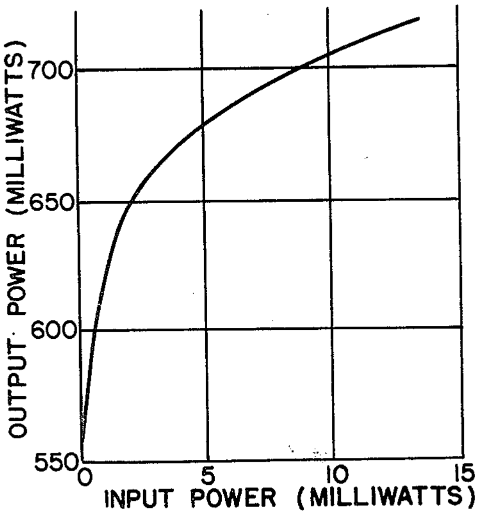
Figure 7:
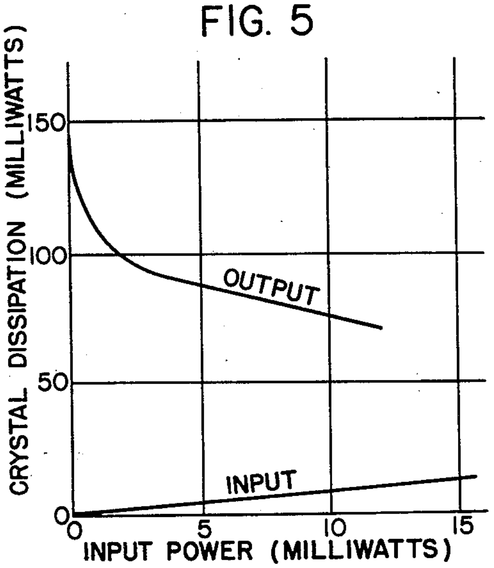

In Fig. 6, input power in milliwatts is plotted as abscissa against power consumed by load resistor 39, also in milliwatts. Input voltage remained fixed and as the input resistance is increased by use of potentiometer 37, power may be computed by multiplying resistance times the reading of $A_1$ squared times 1000 to obtain results in milliwatts. As the graph shows, at low input power values, from 0–2 milliwatts the output power rose sharply from 550 to the neighborhood of 650 milliwatts and then tapered off again evidencing power gain across the load resistor.

Fig. 7 again is a graph of data obtained from readings on the meters of the test circuit shown in Fig. 4, plotting power consumed in input circuit in milliwatts against power dissipation of the germanium crystal 13 in the output and input circuits. For an increase in power consumption in the input circuit from 0 to 15 milliwatts, the crystal dissipation in the input circuit increased linearly in the same neighborhood, approximately 15 milliwatts. However, for a small increase of from 0 to 2, milliwatts of power in the input circuit there is a sharp decrease in crystal dissipation in the output circuit from the neighborhood of 150 down to 100 milliwatts, beyond which point the dissipation tapers off almost linearly.

Figure 8:
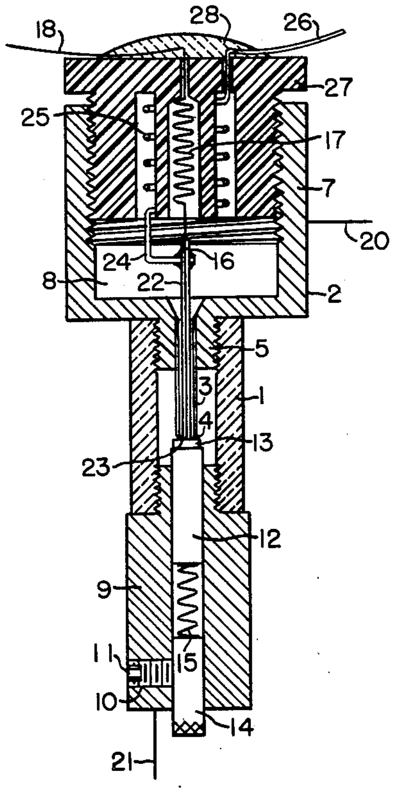
Fig. 8 is an axial cross sectional view of the concentric tetrode translator.

Referring again to Figs. 8, 9 and 10 of the accompanying drawings for a detailed description of the structure and operation of the concentric tetrode translator, many elements will be seen to be common to the triode hereinbefore described. Such common or equivalent elements will bear like numbers as this will readily facilitate the description. Therefore, it will be seen that envelope 1, three step sleeve 2 with the exception that bore 6 of steps 3 and 5 may, but need not be of a larger diameter than in the triode, tip 4, shank 7, mouth 8, sleeve 9, lateral tapped bore 10, set screw 11, short brass rod 12 with semi-conductive element 13 mechanically and electrically attached to one end thereof within envelope 1, control rod 14, compression spring 15, emitter wire 16, spring portion 17 and free end thereof 18, leads 20 and 21, are of similar construction and like function. In addition to these common elements, a third sleeve 22 having on its exterior a fine coating of insulation and its contact end sharply tapered to a circular knife edge tip 23, is inserted in bore 6 of sleeve 2, its tip 23 in contact with crystal 13, its other end extending partially up into mouth 8 of shank 7, and attached thereto electrically and mechanically as by soldering is a nickel chrome wire 24, the diameter of which need not be as small as emitter wire 16, the portion of wire 24 within mouth 8 being coiled into a spring 25 to concentrically envelop spring portion 17 but of sufficiently larger coil diameter to allow ample space for an insulator therebetween, the free end 26 of spring 25 continuing on out of mouth 8 and used as a lead wire for connections. The tips of the knife edges 4 and 23 of the respective elements 3 and 22 may be copper plated and lightly wetted with mercury further to insure good electrical contacts with the crystal 13. Emitter wire 16 will actually extend down the bore of sleeve 22, which is interposed concentrically between emitter 16 and collector 3. In the tetrode, sleeve 22 is comparable to a screen grid for a vacuum tube containing an equal number of elements.

Plug 27, like plug 19, is made of an insulating material, such as polystyrene or Polythene, and shaped to fit mouth 8 either by force fit or threaded, and is center bored a portion of its axial length of sufficient diameter to accept spring portion 17 of emitter 16, the remainder center bored of sufficient diameter to permit passage out of free end 18. Plug 27 then has a second cavity therein concentric with the larger diameter center bore, of sufficient size to accept spring portion 25 of wire 24, with an insulating wall between spring 17 and spring 25, said wall being integral with the remainder of the plug. Plug 27 also has another small bore off center communicating with said concentric cavity to permit passage out of the free end 26 of wire 24. And finally a seal 28 such as wax, cellulose cement or the like is placed over the external end of the plug and free end leads 18 and 26, to completely render the translator moisture and atmosphere proof.

Figure 9:
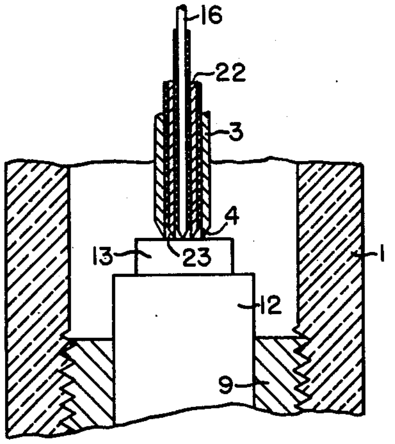
Fig. 9 is an enlarged cut away axial cross sectional view of the tetrode depicting the contact relation of the elements thereof with the semi-conductive crystal.

Fig. 9 is merely an enlarged cut away view showing in greater detail the manner in which the concentric sleeves are insulated one from another, how the ends are tapered to circular knife edges and the way in which said knife edges make concentric contacts with the crystal element 13.

Figure 10:
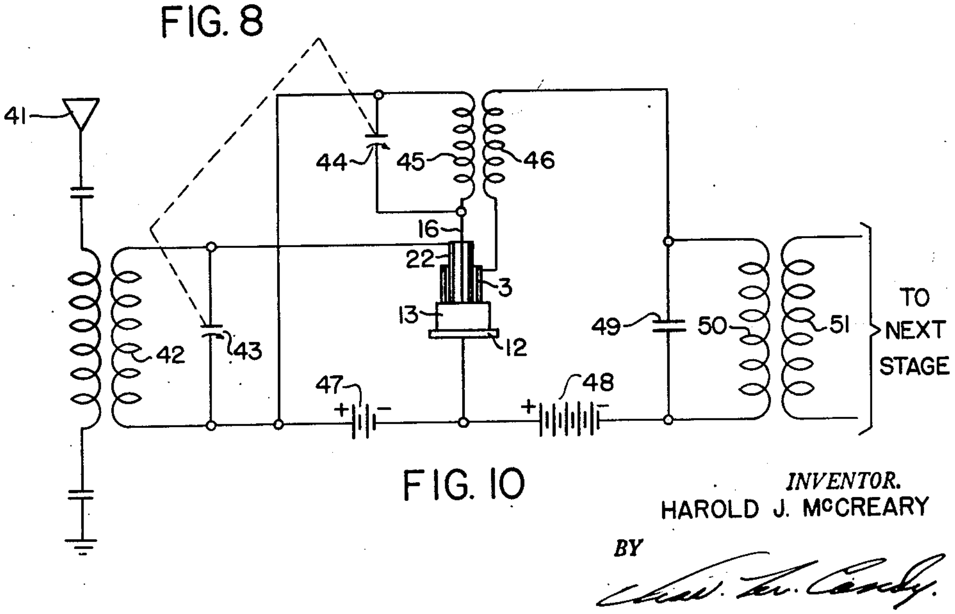
Fig. 10 is a portion of a standard superheterodyne circuit with the concentric tetrode in circuit symbol substituted for the converter tube.

In Fig. 10 is depicted a concentric tetrode transistor in the converter stage of a superheterodyne circuit, the tetrode transistor having been substituted for a conventional four element vacuum tube. In the circuit as shown a signal of a radio frequency is received on antenna 41 and induced into the secondary winding of antenna coil 42. The R. F. signal from the antenna so induced is tuned by condenser 43 so that a maximum R. F. potential is applied between base electrode 12 and sleeve 22. Local oscillation is tuned by condenser 44 which is ganged conventionally to condenser 43 and this local tank circuit comprising condenser 44 and transformer winding 45 is connected across emitter wire 16 and base electrode 12. The input circuit of the mixer stage is traced from crystal 13 thru collector sleeve 22, tank circuit comprising winding 42 and condenser 43, battery 47 to base electrode 12. The output circuit of this mixer stage is traced from crystal 13 thru collector 3, transformer winding 46, tank circuit comprising condenser 49 and winding 50, battery 48 to base electrode 12. A feed back circuit is established from current induced from winding 46 of output circuit back onto winding 45 and its associated tank circuit including condenser 44 and thru coil 42 to feed sleeve 22. Local oscillation set up by the local tank circuit beats against the R. F. fed into the tetrode transistor via the input circuit resulting in an intermediate frequency I. F. in the output circuit which is induced onto coil 51 and passed to a subsequent stage such as described hereinbefore in regard to a triode transistor in an I. F. amplifying stage of such a conventional superheterodyne circuit.

From this detailed description of the triode and tetrode translating devices described herein it can readily be appreciated that transistors of any increased order of elements can be made by merely adding the desired number of insulated concentric sleeves between emitter and collector and increasing the number of concentric springs and cavities to house the spring portions of the elements commensurately. The applicant therefore does not limit his disclosure to translating devices of the order of triodes and tetrodes but expresses inclusion of all higher orders of elements limiting such number only by the bounds of practicality.

Upon this disclosure what is claimed and what applicant desires to be protected by issuance of Letters Patent thereon is:

1. In a translating device of the character described; an envelope of insulating material, two metal sleeves communicating with the interior of said insulating envelope from both ends; the first sleeve comprising three steps of increasing diameters, the middle step fitting tightly into one end of said insulating envelope, the smallest step continuing into said envelope, the smaller two steps having a relatively small bore of uniform diameter, said bore widening out in the third step into a divergent walled mouth; the second sleeve having a uniform bore thruout its length, and fitting snugly into the other end of said insulating envelope, a short rod positioned slidably in said second sleeve and extending into said envelope, a semi-conductive crystal affixed to and electrically connected with the end of said short rod within said envelope, an adaptable control rod also fitted into said second sleeve behind said short rod with relation to said envelope, means to lock said control rod, and a compression spring between said two rods; said rods, locking means and spring co-operating to hold said crystal in circular electrical contact with the smallest diameter end of said first sleeve; an insulated emitter wire extending down the small bore of said first sleeve and terminating in a ground point end, said wire being coiled into a spring toward its other end, and a plug of insulating material shaped to snugly fit said divergent walled mouth, said plug, when fitted into said divergent walled mouth exerting a force on said coil portion of the emitter wire firmly holding said pointed end thereof in electrical contact with said crystal, said point of contact being equidistant from all points of contact on the circular sleeve contacting surface surrounding said point.

2. In a translating device of the character described; an envelope of insulating material threaded at both ends, two metal sleeves communicating with the interior of said insulating envelope from both ends thereof; the first sleeve comprising a metallic hypodermic needle, the exterior of the shank end of said needle being threaded to fit into the end of said insulating envelope, the cannula of said needle being cut off perpendicularly to the axis thereof at a point allowing said cannula to extend into said envelope a major portion of its length; the second sleeve having a uniform bore thruout its length and threaded into the other end of said envelope, a short rod positioned slidably in said second sleeve and extending into said envelope, a semi-conductive crystal affixed to and in electrical connection with said rod within said envelope; and means including a compression spring for holding said crystal in firm circular electrical contact with the cut off end of said cannula; an emitter wire extending down the lumen of said cannula, terminating in a ground point against said crystal, said emitter being coiled into a spring towards its other end; a plug of insulating material shaped to snugly fit the mouth of said needle; said plug being partially bored to retain said coiled spring end of the emitter wire; said plug when fitted into said mouth exerting a force on said coil portion of the emitter firmly holding said ground point end in electrical contact with said crystal, insulating means maintaining said point of contact of said emitter with said crystal equidistant from all points of contact of the cannula with said crystal so that a weak signal incoming on said emitter wire will excite a field in said crystal about said emitter contact point, excitation of said crystal occurring equally in all directions at once, said signal translated onto said continuous circular cannula contact surface within said field and conducted away thereon in a rectified and greatly amplified form.

3. In a translating device substantially as described in claim 2, a copper plated tip on said cannula, the surface of said cannula tip lightly wetted with mercury to insure complete electrical contact of said cannula with said semi-conductive crystal.

4. In a translating device substantially as described in claim 2, said semi-conductive crystal being composed substantially of the element germanium.

5. In a translating device, a semi-conductive crystal, an emitter wire in point contact with said crystal, insulation coated on said emitter wire, a co-axial cylindrical collector concentrically surrounding said emitter and insulated and separated therefrom only by the thickness of said insulation, a coat of insulation on the exterior of said collector, and another co-axial cylindrical collector concentrically surrounding said former collector and insulated and separated therefrom by said coat of insulation therebetween; said collectors being in concentric circular contact with said crystal around said emitter contact point; circuits associated respectively with said crystal, emitter and each collector; the close relationship of the three contacts on said crystal being such that a small signal incoming on said emitter and exciting said crystal causes ionization to occur in all directions simultaneously, said signal being translated and given increased impetus thru said crystal by the inner collector and collected and sent out on the outer collector in greatly amplified form, said inner collector being positioned to eliminate capacitative feed back between said outer collector and said emitter.

6. In a translating device of the character described, an envelope of insulating material, two coaxial metal sleeves communicating with the interior of said envelope from both ends; the first sleeve fitting tightly into one end of said insulating envelope, an extension of said first sleeve continuing into said envelope, the second sleeve having a relatively medium bore uniform thruout its length and fitting snugly into the other end of said envelope, a short rod positioned slidably in said second sleeve and extending into said envelope, a semi-conductive crystal affixed to and electrically connected with the end of said short rod within said envelope, an adjustable control rod also fitted into said second sleeve behind said short rod with relation to said envelope and a compression spring therebetween, means to lock said control rod; said rods, spring and locking means co-operating to hold said crystal in firm circular electrical contact with the small diameter of said extension on said first sleeve; a third sleeve concentrically secured within said first sleeve, an exterior coating of insulation on said third sleeve insulating and separating said third sleeve from said first sleeve by the thickness of said coating of insulation; an emitter wire extending down the bore of said third sleeve, said emitter wire having a coat of insulation insulating and separating said wire from said third sleeve by the thickness of said coat of insulation on said wire, a ground point terminating said emitter wire at one end and said emitter wire being coiled into a spring towards its other end; another wire joined to said third sleeve within the mouth of said third sleeve and being coiled to form a spring concentric with the spring portion of said emitter wire but of larger diameter, and a plug of insulating material threaded to fit the mouth of said first sleeve, said plug having a partial center bore of a diameter sufficient to encase the coiled spring portion of said emitter wire, said plug having a second cut out cavity concentric with the partial center bored portion to encase said coiled spring portion of the wire attached to said third sleeve, said cavity being separated from said center bored cavity by a cylindrical wall integral with the remainder of said plug, said plug when threaded into said threaded mouth exerting a force on said coiled portions of said wires firmly holding said pointed end of said emitter wire, and the end of said third sleeve within said envelope in electrical contact with said crystal.

7. In a translating device of the character described, an envelope of insulating material threaded at both ends, two co-axial metal sleeves communicating with the interior of said envelope from both ends thereof; the first sleeve comprising a metallic hypodermic needle, the exterior of the shank end of said needle being turned down and threaded, fitting into one end of said envelope by said threads, the cannula of said needle being cut off by tapering sharply to a circular knife edge, at a length allowing said cannula to extend into said envelope a major portion of the latter's length; the second sleeve having a uniform bore thruout its length and threaded into the other end of said envelope, a short rod positioned slidably in said second sleeve and one end extending into said envelope, a semi-conductive crystal affixed to and electrically connected with the end of said short rod within said envelope, an adjustable control rod also fitted into said second sleeve behind said short rod with relation to said envelope and a compression spring therebetween, means to lock said control rod; said rods, spring and locking means co-operating to hold said crystal in firm circular electrical contact with the knife edge tapered tip of said cannula; a third sleeve concentrically secured within the lumen of said cannula and having one end sharply tapered to a circular knifelike edge and engaging said crystal and the other end extending up into the mouth of the needle within the shank end thereof, insulation on said third sleeve insulating and separating said third sleeve from said cannula by the thickness of said insulation; an emitter wire extending down the bore of said third sleeve, insulation on said emitter wire insulating and separating said wire from said third sleeve by the thickness of said insulation thereon, said emitter wire terminating in a ground point at one end, said emitter wire being coiled into a spring towards its other end; another wire joined to said third sleeve within the mouth of said shank and coiled to form a spring concentrically enveloping the spring portion of said emitter wire; and a plug of insulating material threaded to fit the mouth of said shank, said plug having a partial center bore of a diameter sufficient to encase the coiled spring portion of said emitter wire and said plug having a second cut out cavity concentric with the partial center bored portion to encase said coiled spring portion of said second wire attached to said third sleeve, said cavity being separated from said partial center bored portion by a cylindrical wall integral with the remainder of said plug, said plug when threaded into said mouth in said shank exerting a force on said coiled portions of said wires firmly holding the pointed end of said emitter wire and the circular knife edged end of said third sleeve in electrical contact with said crystal.

8. In a translating device substantially as described in claim 7, a copper plated tip on said sharply tapered knife edge ends of said cannula and said third sleeve, the circular knife edges of said copper plated tips being lightly wetted with mercury to insure complete electrical contact of said concentric knife edge contacts with said semi-conductive crystal.

9. In a translating device substantially as described in claim 7, said semi-conductive crystal being composed substantially of the element germanium.

References Cited in the file of this patent

UNITED STATES PATENTS

| Number | Name | Date |
|---|---|---|
| 2,476,323 | Rack | July 19, 1949 |
| 2,486,776 | Barney | Nov. 1, 1949 |
| 2,524,033 | Bardeen | Oct. 3, 1950 |
| 1,524,035 | Bardeen et al. | Oct. 3, 1950 |